US008612929B2

(12) United States Patent
Kalogeropulos et al.

(10) Patent No.: US 8,612,929 B2
(45) Date of Patent: Dec. 17, 2013

(54) COMPILER IMPLEMENTATION OF LOCK/UNLOCK USING HARDWARE TRANSACTIONAL MEMORY

(75) Inventors: Spiros Kalogeropulos, Los Gatos, CA (US); Yonghong Song, Palo Alto, CA (US); Partha P. Tirumalai, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1221 days.

(21) Appl. No.: 12/331,950

(22) Filed: Dec. 10, 2008

(65) Prior Publication Data

US 2010/0146480 A1 Jun. 10, 2010

(51) Int. Cl.
*G06F 9/44* (2006.01)
*G06F 9/45* (2006.01)

(52) U.S. Cl.
USPC .......................................... 717/106; 717/147

(58) Field of Classification Search
USPC ........................................................ 717/106
See application file for complete search history.

(56) References Cited

U.S. PATENT DOCUMENTS

| | | | |
|---|---|---|---|
| 6,651,246 B1 | 11/2003 | Archambault et al. | |
| 6,654,954 B1 | 11/2003 | Hicks | |
| 6,880,045 B2 | 4/2005 | Pong et al. | |
| 6,938,130 B2 | 8/2005 | Jacobson et al. | |
| 7,290,056 B1 * | 10/2007 | McLaughlin, Jr. | 709/230 |
| 7,395,531 B2 | 7/2008 | Eichenberger et al. | |
| 7,426,724 B2 | 9/2008 | Kilgard et al. | |
| 7,530,069 B2 | 5/2009 | Kawahara et al. | |
| 7,543,282 B2 | 6/2009 | Chou | |
| 7,818,729 B1 | 10/2010 | Plum et al. | |
| 7,853,934 B2 | 12/2010 | Partamian | |
| 2004/0049667 A1 | 3/2004 | McCormick et al. | |
| 2005/0120059 A1 * | 6/2005 | Verma et al. | 707/200 |
| 2006/0026575 A1 | 2/2006 | Cabillic et al. | |
| 2006/0026580 A1 | 2/2006 | Cabillic et al. | |
| 2006/0294047 A1 * | 12/2006 | Johnston et al. | 707/1 |
| 2007/0050762 A1 | 3/2007 | Chen et al. | |
| 2007/0143741 A1 * | 6/2007 | Harris | 717/121 |
| 2007/0169030 A1 * | 7/2007 | Tarditi et al. | 717/140 |
| 2008/0126883 A1 * | 5/2008 | Caprioli et al. | 714/49 |

(Continued)

OTHER PUBLICATIONS

"Design and Evaluation of Dynamic Optimizations for a Java Just-in-Time Compiler", Suganuma, et al., Jul. 2005, pp. 732-785, http://delivery.acm.org/10.1145/1080000/1075386/p732-suganuma.pdf.

(Continued)

*Primary Examiner* — Li B Zhen
*Assistant Examiner* — Arshia S Kia
(74) *Attorney, Agent, or Firm* — Rory D. Rankin; Meyertons, Hood, Kivlin, Kowert & Goetzel, P.C.

(57) ABSTRACT

A system and method for automatic efficient parallelization of code combined with hardware transactional memory support. A software application may contain a transaction synchronization region (TSR) utilizing lock and unlock transaction synchronization function calls for a shared region of memory within a shared memory. The TSR is replaced with two portions of code. The first portion comprises hardware transactional memory primitives in place of lock and unlock function calls. Also, the first portion ensures no other transaction is accessing the shared region without disabling existing hardware transactional memory support. The second portion performs a fail routine, which utilizes lock and unlock transaction synchronization primitives in response to an indication that a failure occurs within said first portion.

20 Claims, 5 Drawing Sheets

(56) References Cited

U.S. PATENT DOCUMENTS

| | | | |
|---|---|---|---|
| 2008/0163185 A1 | 7/2008 | Goodman | |
| 2008/0195549 A1* | 8/2008 | Phillips | 705/64 |
| 2008/0244544 A1* | 10/2008 | Neelakantam et al. | 717/147 |
| 2009/0217253 A1* | 8/2009 | Song et al. | 717/161 |
| 2009/0276758 A1* | 11/2009 | Song et al. | 717/124 |
| 2009/0288075 A1* | 11/2009 | Song et al. | 717/160 |
| 2011/0197029 A1* | 8/2011 | Saha et al. | 711/118 |
| 2011/0276611 A1* | 11/2011 | Verma et al. | 707/826 |
| 2012/0016853 A1* | 1/2012 | Wang et al. | 707/703 |
| 2012/0174083 A1* | 7/2012 | Shpeisman et al. | 717/153 |
| 2012/0179875 A1* | 7/2012 | Saha et al. | 711/133 |

OTHER PUBLICATIONS

"Compiler Optimization of Embedded Applications for an Adaptive SoC Architecture", Hardnett, et al., Oct. 2006, pp. 312-322, http://delivery.acm.org/10.1145/1180000/1176798/p312-hardnett.pdf.

"Dynamic Code Management: Improving Whole Program Code Locality in Managed Runtimes", Huang, et al., Jun. 2006, pp. 133-143, http://delivery.acm.org/10.1145/1140000/1134779/p133-huang.pdf.

"ACME: Adaptive Compilation Made Efficient", Cooper, et al., Jul. 2005, pp. 69-77, http://delivery.acm.org/10.1145/1070000/1065921/p69-cooper.pdf.

Song, Y., et al; "Design and Implementation of a Compiler Framework for Helper Threading on Multi-Core Processors;" IEEE PACT 2005, (Sep. 2005); pp. 99-109.

Damron, P., et al; "Hybrid Transactional Memory"; ASPLOS XII; San Jose, CA (2006); http://www.princeton.edu/~asplos06/tprogram.html.

Su, E., et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. of the 14th International Symposium on High-Performance Computer Architecture; (2008).

* cited by examiner

COMPILER IMPLEMENTATION OF LOCK/UNLOCK USING HARDWARE TRANSACTIONAL MEMORY

BACKGROUND OF THE INVENTION

1. Field of the Invention

This invention relates to computer systems, and more particularly, to automatic efficient parallelization of code combined with hardware transactional memory support.

2. Description of the Relevant Art

The performance of computer systems is dependent on both hardware and software. In order to increase the throughput of computing systems, the parallelization of tasks is utilized as much as possible. To this end, compilers extract parallelized tasks from program code and many modern processor designs have deep pipelines with multiple cores configured to perform simultaneous multi-threading. However, with multi-core chips and multi-threaded applications, it becomes more difficult to synchronize concurrent accesses to shared memory by multiple threads. This makes it more difficult to ensure that the right operations are taking place at the right time, without interference or disruption, at high performance. The net result is that applications written for multi-processing workloads are currently not achieving the theoretical peak performance of the system.

Locking mechanisms on shared memory is one aspect of software design that disallows peak performance of a system. In place of locking mechanisms, transactional memory improves performance by allowing, in one embodiment, a thread to complete read and write operations to shared memory without regard for operations of other threads. Generally speaking, a transaction may comprise a sequence of operations that perform read and/or write operations to shared memory. These read and write operations may logically occur at a single instant in time. Accordingly, the whole sequence of instructions may occur in an atomic manner, such that intermediate states are not visible to other transactions.

In various embodiments, a division of work may be a software process consisting of one or more threads or a transaction consisting of one or more processes. Taking a thread as an example, with transactional memory, each thread records each of its read and write operations in a log. In one embodiment, when an entire transaction completes, validation may occur that checks other outside threads and transactions have not concurrently modified its accessed memory locations. In an alternative embodiment, validation may occur upon the completion of each memory access in order to verify other transactions have not concurrently modified its accessed memory locations. Once successful validation occurs, the transaction performs a commit operation. If validation is unsuccessful, the transaction aborts, causing all of its prior operations to be rolled back. Then re-execution occurs until the transaction succeeds.

Transactional memory has recently received significant attention from researchers as a promising way to ease the development of correct, efficient and scalable concurrent programs, which would further the throughput of systems with further parallelization of tasks. Transactional memory may be used to support explicit transactional programming styles, as well as to improve the performance and scalability of traditional lock-based programs and other synchronization mechanisms. Transactional memory may be implemented entirely in software. However, software techniques involve significant overhead and thus, incorporate a performance penalty and scalability limits. Proposals for hardware transactional memory are very complex due to ensuring correct interaction with various difficult events such as exceptions, interrupts, and context switches. Modern attempts of designing hardware transactional memory support within a processor may be simplified by guaranteeing support only for transactions of a predetermined size limit, transactions of a predetermined duration limit, transactions that do not include predetermined difficult instructions, transactions that do not exceed on-chip hardware resources, other, or a combination thereof.

Traditional lock-based synchronization mechanisms comprise lock and unlock primitives that may require hundreds of clock cycles to complete. Furthermore, it is very difficult for the user to modify existing code with locks and use hardware transactional memory support. Software locks specified by a software programmer and hardware transactions specified by a compiler do not block one another from shared resources such as a shared data structure.

In view of the above, efficient methods and mechanisms for automatic efficient parallelization of code combined with hardware transactional memory support are desired.

SUMMARY OF THE INVENTION

Systems and methods for automatic efficient parallelization of code combined with hardware transactional memory support are contemplated. In one embodiment, a method comprises examining program instructions of a multi-threaded application in order to identify a transaction synchronization region (TSR) utilizing lock and unlock transaction synchronization function calls. The lock and unlock synchronization function calls are used for accesses of a particular shared region within shared resources, such as a particular shared sub region within a shared memory. The TSR is replaced with two portions of code. The first portion comprises hardware transactional memory primitives in place of lock and unlock function calls. Also, the first portion verifies no other transaction is accessing the shared region without disabling existing hardware transactional memory support. The second portion performs a failed routine utilizing lock and unlock transaction synchronization primitives in response to an indication that a failure occurs within said first portion.

In addition, the method determines a prediction whether the transformed TSR fails. Examples of failure conditions, which may utilize program profiling information, include the TSR comprises a predetermined instruction type, the TSR exceeds available space in a store buffer, and the TSR comprises more than a predetermined number of instructions.

In various embodiments, a back-end compiler or a program code comprises an optimizer configured to examine program instructions of a multi-threaded application to identify a TSR utilizing lock and unlock transaction synchronization function calls for a shared region. The TSR is replaced with two portions of code. These portions of code have the functionality described above.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
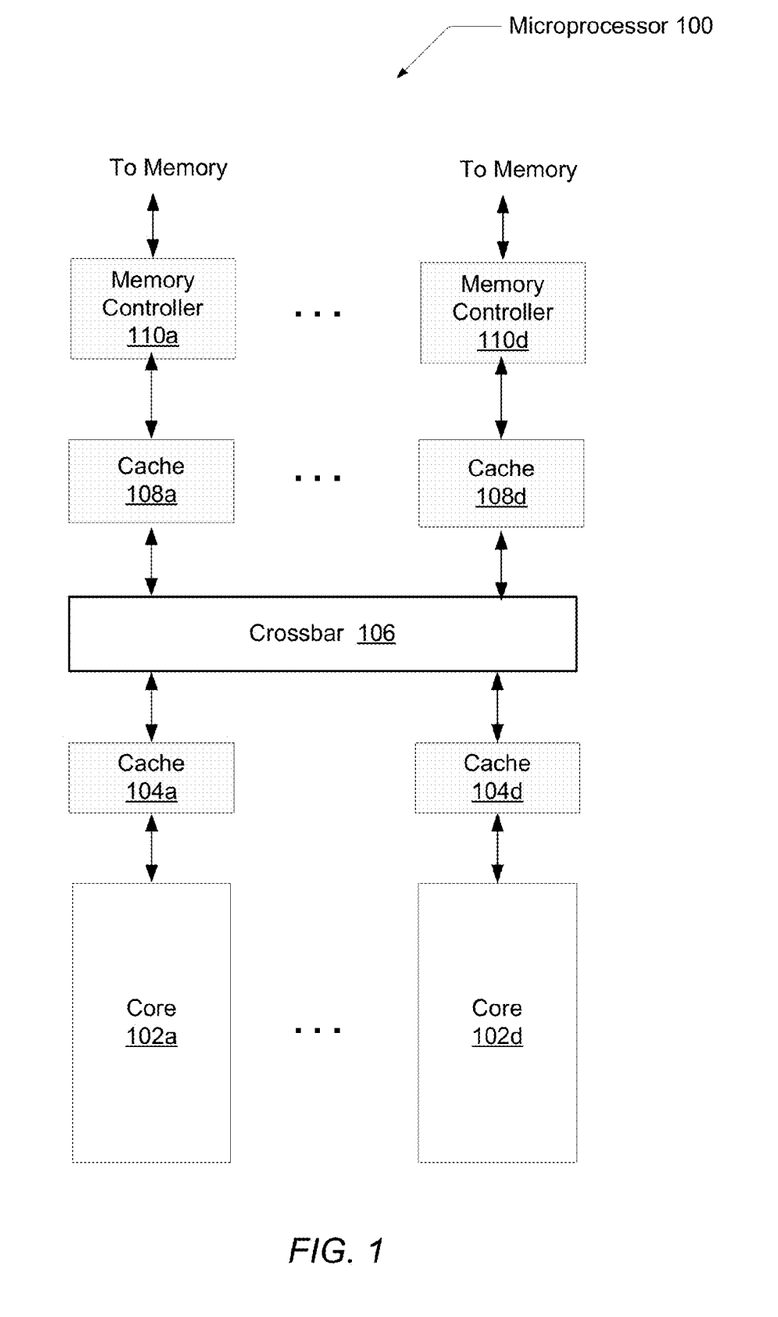
FIG. 1 is a generalized block diagram illustrating one embodiment of a multi-core microprocessor.

Referring to FIG. 1, one embodiment of a multi-core microprocessor 100 is shown. Microprocessor 100 may have multiple cores 102a-102d. As used herein, elements referred to by a reference numeral followed by a letter may be collectively referred to by the numeral alone. For example, cores 102a-102d may be collectively referred to as cores 102. Each core 102 may include a superscalar microarchitecture with one or more multi-stage pipelines. Each core 102 may be configured to execute instructions of software applications corresponding to an instruction set architecture (ISA) such as x86, SPARC, PowerPC, MIPS, ARM, or other. Also, each core 102 may be designed to execute multiple strands, or threads. For example, a multi-thread software application may have each of its software threads scheduled to be executed on a separate pipeline within a core 102, or alternatively, a pipeline may process multiple threads via control at certain function units. Each core 102 may comprise a first-level cache or in other embodiments, the first-level cache 104 may be outside the core 102.

A crossbar 106 may be used to connect each core 102 and first-level cache 104 to shared resources such as second-level caches 108 and lower-level memory via memory controllers 110. Interfaces between crossbar 106 and the different levels of caches 104 and 108 may comprise any suitable technology. In other embodiments, other levels of caches may be present between cache 108 and memory controller 110. Also, an I/O bus adapter, not shown, may be coupled to crossbar 106 to provide an interface for I/O devices to caches 104 and 108 and cores 102. In another embodiment, an I/O interface may be implemented in memory controller 110. Memory controllers 210 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 110 on microprocessor 100.

A multi-thread software application may be written by a designer to be executed on a multi-core processor, such as the one in FIG. 1, or on a multi-processor chip. The multi-thread program needs to be compiled prior to execution on a system such as microprocessor 100.

A compiler is a set of programs for translating source code, such as a multi-thread software program, into another computer language, or target code. The source code may be software applications written by a designer in a high-level language such as C, C++, Fortran, or other. The target code may be machine code or bytecode depending on the type of compilation being performed. In one embodiment, source code may be statically compiled by one compiler to machine code, which may be subsequently executed on the same machine or processor. Machine code is a general term that refers to patterns of bits with different patterns corresponding to different commands, or instructions, to the machine, or processor.

In an alternative embodiment, the target code may be bytecode. Source code may be statically compiled to bytecode on a first machine or processor, wherein the bytecode is subsequently input to a Just-In-Time (JIT) compiler, a dynamic compiler, on a second machine or processor. Bytecode is a general term for different forms of instruction sets designed for efficient execution by a software interpreter as well as being suitable for further compilation, such as a Just-In-Time (JIT) compiler, into machine code. A software interpreter is a program designed to run other non-executable programs directly without a compiler. Bytecode may be portable among different computer architectures. The bytecode may then be directly interpreted and executed or it may be compiled such as disassembled, optimized, translated, and subsequently run on a virtual machine.

Most modern compilers may be split into a number of relatively independent phases, or passes. Separate phases allow one or more phases to be later improved or replaced, and additional phases may later be inserted to permit additional optimizations. Although modern compilers have two or more phases, these phases are usually regarded as being part of the front-end or the back-end. There is not a hard boundary of responsibilities between these two phases.

Generally speaking, the front-end performs syntactic and semantic processing and translates the source code to a lower-level representation. This lower-level representation may be an output of a front-end phase or other intermediate stage within a static compiler. Alternatively, this lower-level representation may be bytecode to be input to a dynamic Just-In-Time (JIT) compiler. A static translation from source code to a lower-level representation that does not include bytecode to machine code, in addition to no utilization of a virtual machine, allows the source code to be optimized for performance on a particular hardware platform, rather than to be optimized for portability across different computer architectures. A static translation from source code to bytecode, which is subsequently input to a virtual machine, allows the source code to be optimized for portability across different computer architectures and performance may not reach a peak value.

Optimizations may be performed on this lower-level representation. The independence provided by the lower-level representation of the source code from the machine code allows generic optimizations to be shared between versions of the compiler.

The back-end compiler takes the output from the front-end compiler, or the lower-level representation, and performs more analysis, transformations, and optimizations for a particular hardware platform. Then it generates machine code for a particular processor and operating system (OS). Basic components of a back-end compiler may include a processor core selection unit for determining the number of available hardware threads and assigning software threads to the available hardware threads, a preprocessor for receiving the lower-level representation and dividing instructions into basic components, an optimizer for performing transformations and optimizations after analysis of the lower-level representation, and a code generator for conveying a machine code as an output. An advantage of splitting the front-end of a compiler from the back-end is front-ends for different languages may be combined with back-ends for different processors.

Both dynamic and static compilation implementations are possible and contemplated. Dynamic compilation performs optimizations that may only be known at runtime, or during the actual execution of a program. Application programs compiled in this manner may initially execute slowly until most of the compilation and recompilation is completed. Then the application should execute quickly. Some optimizations that could be done at the initial compile time may be delayed until further compilation at runtime. However, at development time, dynamic compilation can recompile the code if this is found to be advantageous. Static compilation performs all optimizations prior to runtime. Intensive optimization may be performed prior to runtime. In contrast, dynamic compilation performs analysis at execution time, and thus it may be limited to simple optimizations that can be performed without a large impact on the combined compile and execute time. Compared to dynamic compilation, static compilation requires a smaller start-up cost, smaller memory usage, and it permits automatic sharing of code by the OS between applications. Many more factors may be investigated while comparing the two different forms of compilation and the chosen compiler depends on the design situation.

Figure 2:
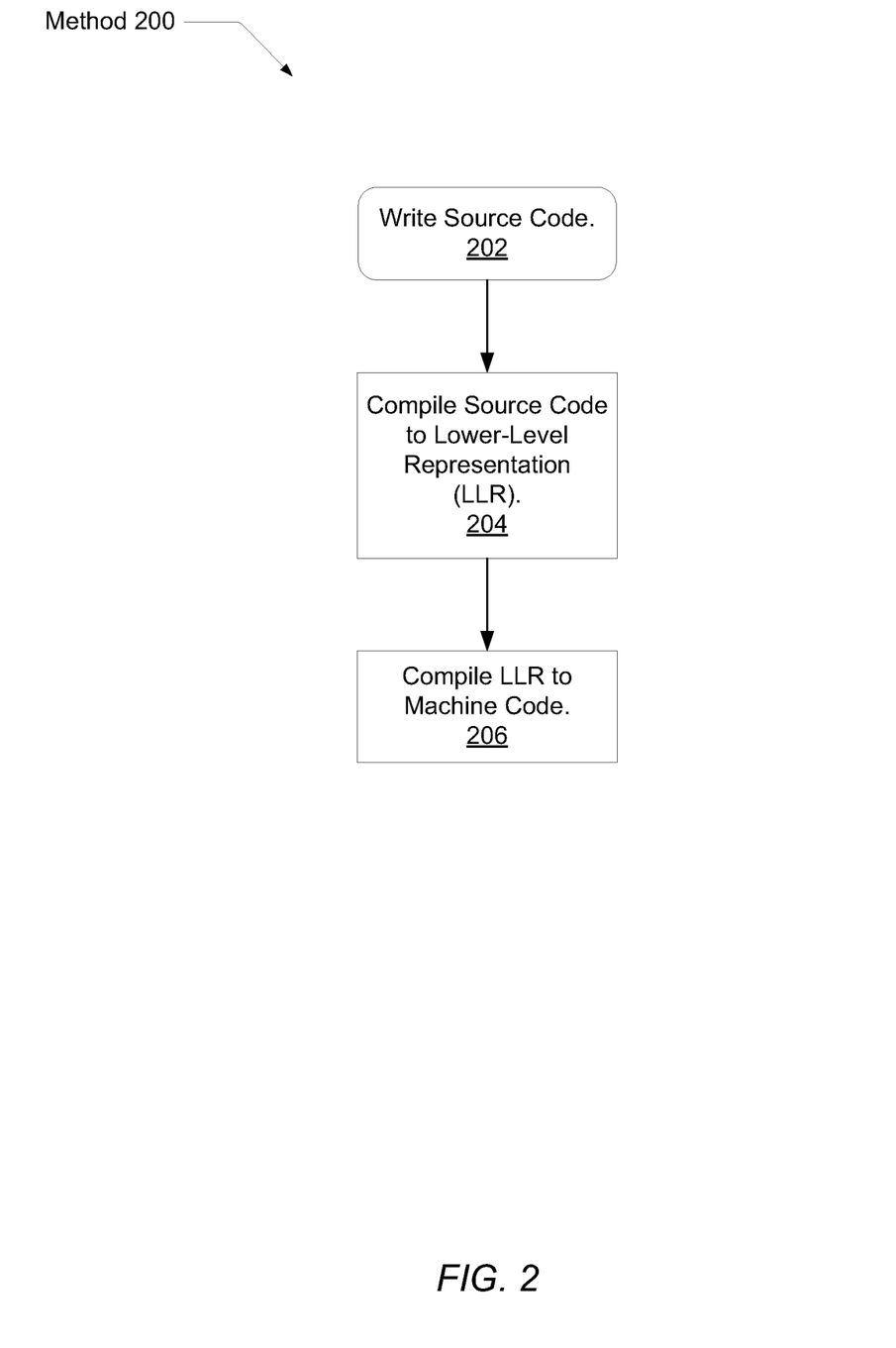
FIG. 2 is a flow diagram illustrating one embodiment of a compiler method.

Referring to FIG. 2, one embodiment of a compiler method 200 is shown. Method 200 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment.

Software applications may be written by a designer in a high-level language such as C, C++, Fortran, or other in block 202. This source code may be stored on a computer readable medium. A command instruction, which may be entered at a prompt by a user or placed within a scripting language, with any necessary options may be executed in order to compile the source code.

In block 204, the front-end compilation translates the source code to a lower-level representation. Syntactic and semantic processing as well as some optimizations is performed at this step. In one embodiment, the compilation method is completely static and the lower-level representation is an output of a front-end phase to be further compiled statically into machine code. In an alternative embodiment, the compilation method is static upfront wherein the lower-level representation is bytecode to be further compiled dynamically into machine code by a JIT compiler within a virtual machine.

Back-end compilation in block 206 translates the lower-level representation to machine code. The back-end may perform more transformations and optimizations for a particular computer architecture and processor design. For example, a processor is designed to execute instructions of a particular instruction set architecture (ISA), but the processor may have one or more processor cores. The manner in which a software application is executed in order to reach peak performance may differ greatly between a single-, dual-, or quad-core processor. Other designs may have eight cores. Regardless, the manner in which to compile the software application in order to achieve peak performance may need to vary between a single-core and a multi-core processor.

The task of spawning and terminating threads, as well as scaling the number of threads according to the number of available processors or processor cores, may be performed by code referred to as a parallelization library (PL). The PL will apply a scheduling policy, which is determined and passed in by the back-end compiler, to partition work among multiple threads. As one skilled in the art is aware, there are many different scheduling policies.

One optimization that may be performed at this step is transforming user-specified lock/unlock regions to an efficient region that interacts with hardware transactional memory support within a processor. User-specified lock contention may be used to prevent potential overlapped accesses to shared memory, such as caches 104 and 108 and Memory in FIG. 1. However, it also reduces performance when cores are in a wait state until the lock is removed. In addition, the user-specified lock regions do not prevent any on-chip hardware transactional memory support from performing overlapped accesses to shared resources such as a shared data structure within shared memory.

Figure 3:
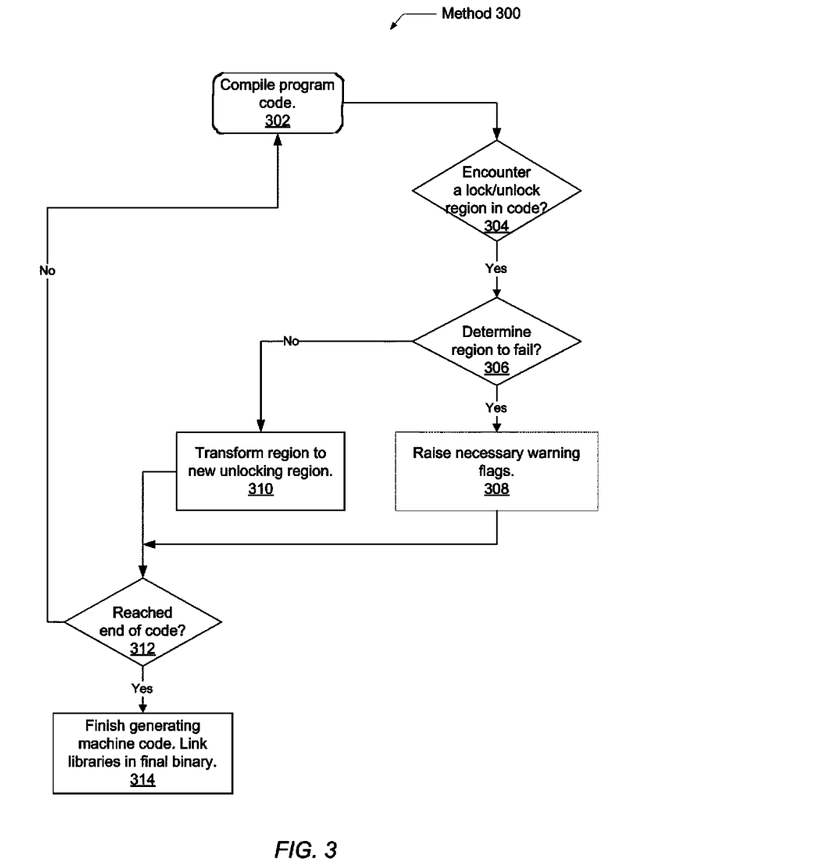
FIG. 3 is a flow diagram illustrating one embodiment of a method for automatic efficient parallelization of code combined with hardware transactional memory support.

Turning now to FIG. 3, one embodiment of a method 300 for automatic efficient parallelization of code combined with hardware transactional memory support is shown. Method 300 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, source code has been translated and optimized by front-end compilation and the respective lower-level representation has been conveyed to a back-end compiler in block 302.

A user-specified lock/unlock region may be placed in the program code and subsequently encountered or identified during compilation (conditional block 304). A simple example of such a region is provided in the following:

| lock (lock_variable_ptr) | /* line 1 */ |
|---|---|
| <access shared resources> | |
| unlock (lock_variable_ptr) | /* line 3 */ |

The above example provides a general format for a transaction synchronization region of code. If a software application utilizes a different format for such function calls than is recognized by a particular compiler and microarchitecture, then a software programmer may use pragmas to indicate to a compiler the function calls which adhere to the semantics and perform the functionality of the required transaction synchronization calls. The software programmer may utilize a scripting language to perform these alterations, or perform them manually. In one embodiment, the pragmas may be of the forms shown in the following:

| #pragma | lock_function | <function_name> | /* line 4 */ |
|---|---|---|---|
| #pragma | unlock_function | <function_name> | /* line 5 */ |

Subsequently a determination may be made regarding the body of code within the <access shared resources> portion, or line 2 above, as to whether this particular region may fail assuming it is transformed to operate with hardware transaction memory (conditional block 306). This determination may be based on static checks performed by the compiler, dynamic checks determined by program profiling information, or both. Reasons for determining transaction failure may include the size of the transaction, the time duration required to process the transaction, the transaction comprises a certain instruction type such as an integer divide instruction, the transaction exceeds a limit on an on-chip resource such as available space in a cache set or in the store buffer, the transaction includes a predetermined event such as a TLB miss, or other.

Some reasons for transaction failure may require program profiling information. For example, program profiling may provide the number of store operations or other specified instruction actually performed within a transaction region, the success and failure rates of a transaction region, the number of cache misses within a transaction region, or other. During such a profitability check, if a transformed transaction region is determined to fail due to the limitations of the processor implementation of the hardware transaction region (conditional block 306), then, in one embodiment, a warning or error flag may be set with a corresponding description in a summary log file in block 308. The warning and corresponding description may provide the reason for determining a transformation of the particular transaction region is not profitable. Afterwards, a designer may browse the log file to learn the reason for no modification of the source code regarding a particular transaction region.

If a transaction region is determined not to fail due to the limitations of the processor implementation of the hardware transaction region (conditional block 306), then, in one embodiment, the transaction region may be transformed in block 310 to a new unlocking region that still synchronizes its operations with hardware transactional memory. The converted code may exploit the features that implement the semantics of a transactional memory section in hardware by using the command pair chkpt and commit. By doing so and removing the lock/unlock command pair, performance may increase due to bypassing the hundreds of clock cycles required for the lock/unlock synchronization primitives. This solution of converting code may provide a very fast access to shared resources when the hardware does not detect conflicts of any accesses to the shared resources. Code lines 1-3 from above may be converted to the following:

```
chkpt FailedPC                                      /* line 6 */
<access shared resources>
commit
goto Next
FailedPC:                                           /* line 10 */
    lock (lock_variable_ptr)
    <disable hardware transaction region mechanism>
    <access shared resources>
    <enable hardware transaction region mechanism>
    unlock (lock_variable_ptr)                      /* line 15 */
    goto Next
```

It is noted that the two above code segments shown at lines 6 and 10 above may be placed in different locations of the compiled code and not within contiguous locations. Although the FailedPC segment is labeled as line 10 above, this labeling is for illustrative purposes only and does not denote a line number of the compiled code itself. Again, program profiling information of the success rate of hardware transaction regions may be used to guide the compiler to determine if the above transformation is beneficial. The optimization may be completed when all the transaction synchronization regions of code, which use transaction synchronization calls, are processed and optimized.

A chkpt/commit command pair is used in lines 6-8 above. The lock/unlock synchronization shown in lines 11 and 15 above may only be used when a failure occurs. One example of a failure is a first user-specified transaction accesses the shared resources, but then at the commit stage, it is discovered that a second user-specified transaction in the code is simultaneously accessing the same shared resources. Another example of a failure is the first user-specified transaction may exceed a limit on an on-chip resource, although, it was predicted not to do so.

It is noted that user-specified lock regions do not prevent any on-chip hardware transactional memory support from performing overlapped accesses to shared resources. One solution to this problem may be to disable, and subsequently enable again, the hardware transaction region mechanism prior to and after the accesses of the shared resources. The instructions for disabling and enabling the hardware transaction region mechanism exist in most hardware transactional memory implementations. For example, lines 12 and 14 above perform this disabling and enabling of the hardware transaction region in order to prevent overlapped accesses. Although, this solution would prevent simultaneous accesses of the shared resources, it may greatly reduce system performance as all transactions are halted. Transactions that currently are not accessing the same shared resources are halted or aborted as well. Disabling the hardware transaction region mechanism causes every transactional memory section (i.e. chkpt/commit regions) executed by different threads to fail until the enabling of the hardware transaction region mechanism.

One solution to the above performance reduction issue is to fail threads selectively such as failing only the threads that try to access the same shared resources. A variant to the commit instruction may include an address field. The storage location, such as one extra entry in a shared data structure being accessed, corresponding to the provided address may be examined. Following, the commit may be performed only when the stored value holds a predetermined value, such as a non-zero value. The commit instruction may fail if this stored value does not match a predetermined value, or, in one embodiment, this stored value is zero. For example, a commit instruction may be successful when the value lock_variable_ptr->safe_to_commit is 1, which guarantees that the other threads accessing the same shared resources will be already out of the lock/unlock region. This value may be initialized to 1. If a commit instruction with an address field is available in hardware then the more efficient implementation may be used. An example of replacing code lines 1-3 above with this more efficient implementation is provided in the following:

```
chkpt FailedPC                                      /* line 17 */
<access shared resources>
commit &(lock_variable_ptr->safe_to_commit)
goto Next                                           /* line 20 */
FailedPC:
    lock (lock_variable_ptr)
    lock_variable_ptr->safe_to_commit = 0
    <access shared resources>
    lock_variable_ptr->safe_to_commit = 1           /* line 25 */
    unlock (lock_variable_ptr)
    goto Next
```

In one embodiment, thread synchronization may be achieved by standard library calls such as pthread_mutex_lock and pthread_mutex_unlock library calls, then the data structure, for instance, pthread_mutex_t, which is used by pthread_mutex_lock and pthread_mutex_unlock may be extended to include the field "safe_to_commit". The purpose of this field is to provide an address, which can be accessed by all threads, which use the same lock. The same extension is required to the data structure used by any other sun library thread synchronization calls.

On the other hand, if the application does not use standard library thread synchronization calls and/or the designer has utilized pragmas to indicate to the compiler the function calls which adhere to the semantics and perform the functionality of Sun Microsystems or other chosen library thread synchronization calls, then a unique memory location, such as "safe_to_commit", may be associated with the lock variable. If a lock variable is a global variable, the associated "safe_to_commit" memory location may be allocated on the heap at the beginning of the main function. If the lock variable is a local variable, then the above "safe_to_commit" memory location may be allocated on the stack where the lock variable is updated at runtime. A hash table with entries that are pointers to all the "safe_to_commit" memory locations may be maintained.

In one embodiment, when the compiler identifies a thread synchronization region, such as code lines 1-3 above, a function "get_associated_ptr" may be called that provides the address of the corresponding lock_variable_ptr "safe_to_commit" memory location. For example, a new code line may be: safe_to_commit_ptr=get_associated_ptr (hash_table, lock_variable ptr). This new code line may be used to produce the following optimized code:

```
chkpt FailedPC                          /* line 15 */
  <access shared resources>
  commit safe_to_commit_ptr
FailedPC:
  lock <lock_variable_ptr>
  *safe_to_commit_ptr = 0               /* line 20 */
  <access shared resources>
  *safe_to_commit_ptr = 1
  unlock <lock_variable_ptr>            /* line 23 */
```

In one embodiment, for local lock variables, the compiler could remove the corresponding "safe_to_commit" memory location from the hash table at the end of the local lock variable scope, in order to conserve the space.

Both conditional blocks 304 and 312 flow to block 314 in method 300. Here, the corresponding code style is translated to binary machine code and function calls defined in libraries, such as the PL, are included in the binary.

Figure 4:
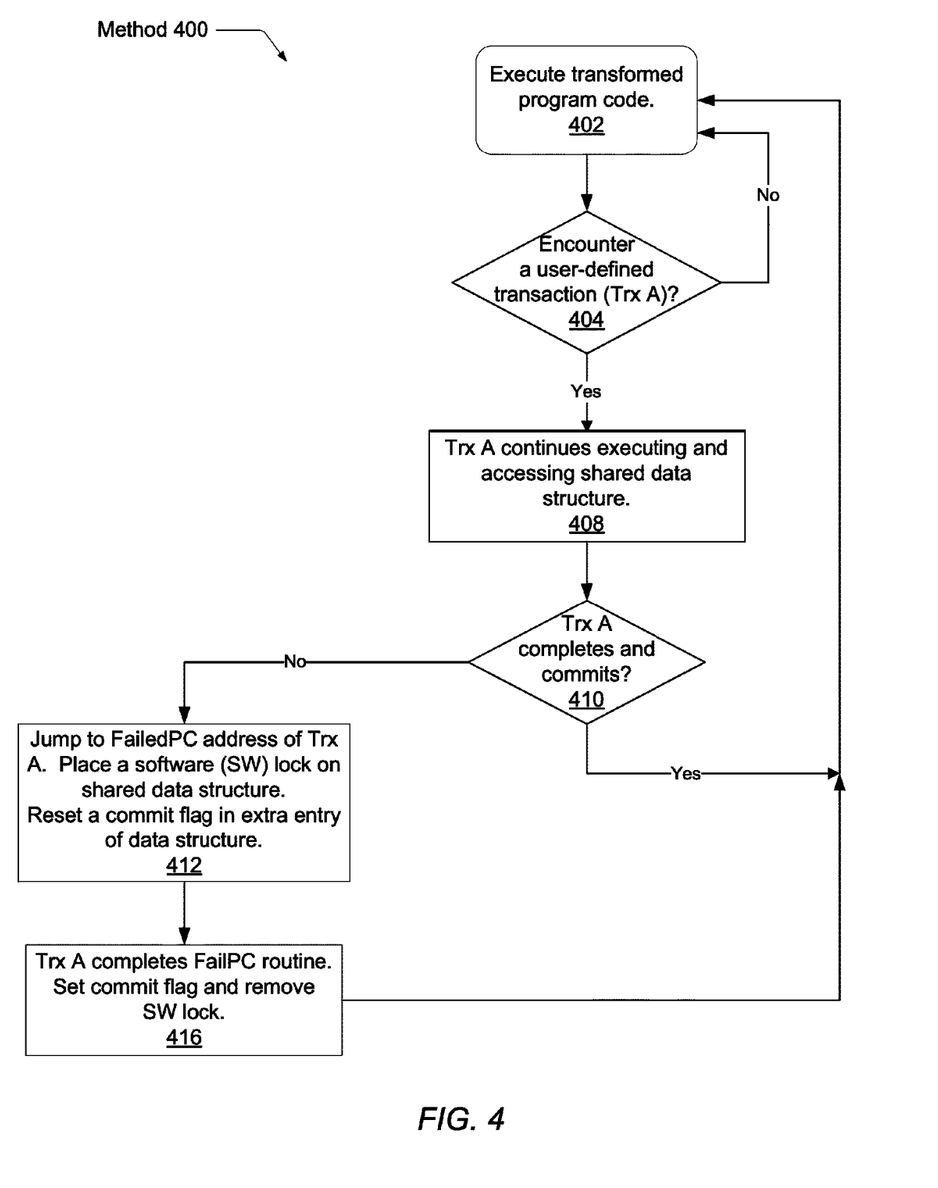
FIG. 4 is a flow diagram illustrating one embodiment of a method for executing software lock synchronization for a transaction.

Referring now to FIG. 4, one embodiment of a method 400 for executing software lock synchronization for a transaction is shown. As with method 300, method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, source code has been compiled, transaction synchronization regions (TSR) utilizing lock and unlock transaction primitives have been converted, and execution of the compiled code has begun in block 402.

A converted TSR may be executing in the code (conditional block 404). The executing transaction, or Transaction A, may not have been predicted to fail during compile time, such as comprising a predetermined problematic instruction type or exceeding the limits of an on-chip resource such as a store buffer. If Transaction A does not encounter an indication of a failure prior to or during execution, then Transaction A continues executing and accessing the shared data structure in block 408. If Transaction A completes its operations and successfully commits its results (conditional block 410), then control flow of method 400 returns to block 402. Otherwise, control flow returns to conditional block 412.

When transaction A actually encounters a failure during execution, it may jump to its corresponding fail routine indicated by its FailedPC address in block 412. A software lock may be placed on the shared region being accessed by a lock synchronization primitive. In addition, a commit flag, which may be stored in a memory location such as an extra entry in the shared accessed data structure, may be reset to denote it is not safe for other transactions to commit completed operations based on this data structure. Transaction A continues to execute its fail routine until completion in block 416. Then Transaction A may set the commit flag to denote other transactions may access the shared data structure and commit results. An unlock primitive may follow in execution.

Figure 5:
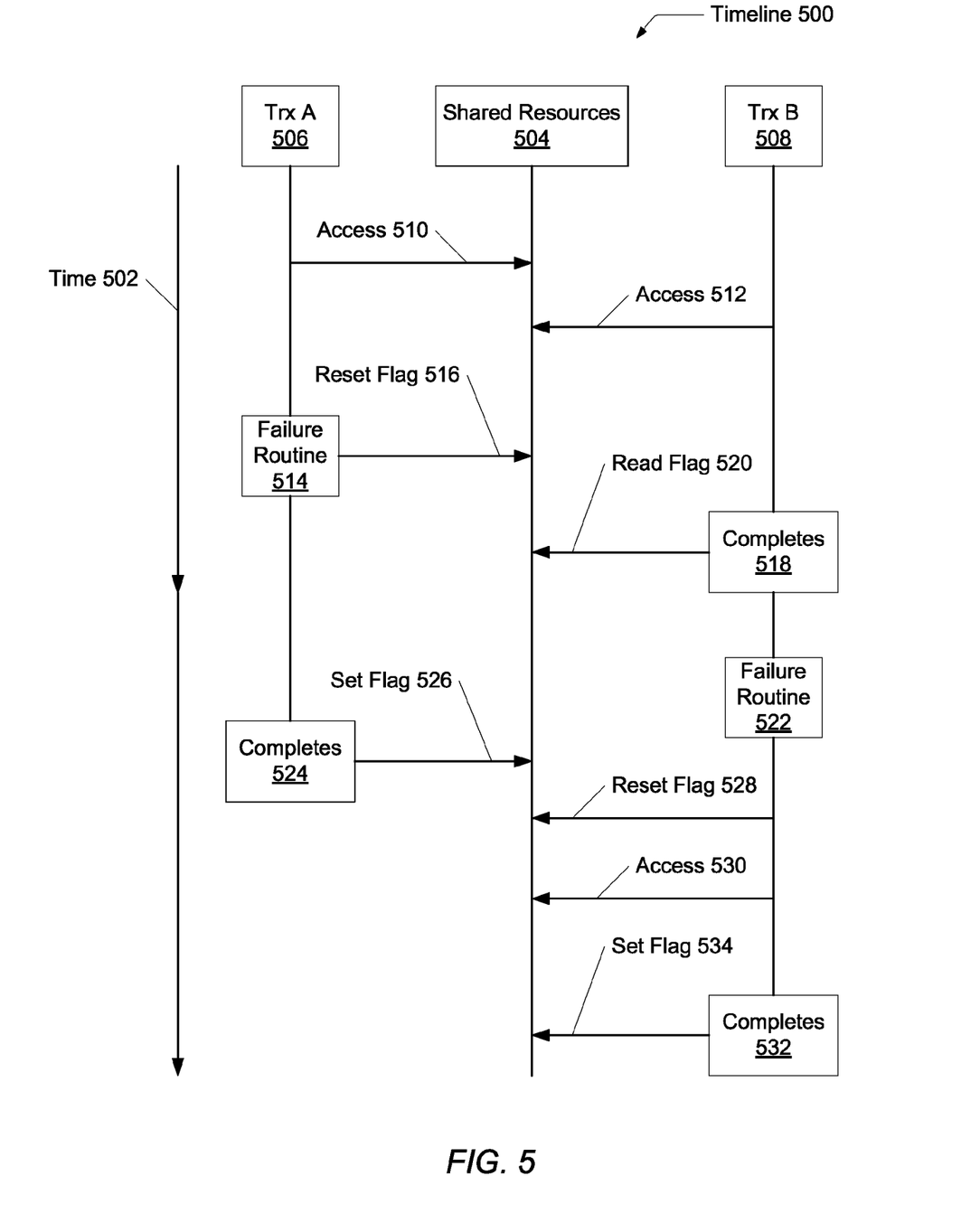
FIG. 5 is a general block diagram illustrating one embodiment of a timeline for executing software lock synchronization with hardware transactional memory support.

Turning now to FIG. 5, one embodiment of a timeline 500 for executing software lock synchronization with hardware transactional memory support is shown. A vertical timeline 502 is shown for illustrative purposes to show an ordering of steps. In one embodiment, shared resources 504 may comprise a data structure that may be accessed by transactions such as a user-specified Transaction A 506 within the source code and Transaction B, a transaction from within the hardware transactional memory support.

Transaction A 506 may begin accessing the shared resources 504 at step 510. Later, at step 512, Transaction B 508 may simultaneously access the same shared region within shared resources 504, since there may not be a mechanism to block such a simultaneous access from hardware transactional memory support. Prior to a commit operation, Transaction A may encounter a failure during execution at step 514. Accordingly, Transaction A may jump to its corresponding failure routine indicated by its FailedPC address. A software lock may be placed on the shared region, or data structure being accessed, by a lock synchronization primitive. In addition, a commit flag, which may be stored in a memory location such as an extra entry in the shared accessed data structure, may be reset in step 516 in order to indicate it is not safe for other transactions to commit completed operations based on this data structure. Transaction B may complete its operations in step 518 prior to Transaction A. Transaction B may read the memory location storing a value for the commit flag in step 520, which is reset to denote no other transaction may safely commit. Since this commit flag value is reset, Transaction B jumps to its failure routine at step 522 stored at its corresponding FailedPC address. In this routine, Transaction B waits for the lock to be removed.

When Transaction A completes its operations and commits its results in step 524, it sets the corresponding commit flag value and executes an unlock synchronization primitive. Now the software lock is removed. Transaction B later acquires the lock, resets the corresponding commit flag, and continues executing its operations and accessing the shared data structure in step 530. Transaction B may continue executing its operations and accessing the shared data structure until a successful completion in step 532. The corresponding commit flag is set in step 534 and the lock is removed.

Various embodiments may further include receiving, sending or storing instructions and/or data implemented in accordance with the above description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. A computer-accessible medium may also include transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method executable by a processor for parallelizing code using transaction memory comprising:
   examining one or more program instructions;
   identifying a transaction synchronization region (TSR) within said program instructions, wherein the TSR accesses a shared region of memory within a shared memory;
   performing no transformation of the TSR, in response to predicting a transformed TSR will fail during execution; and
   in response to predicting a transformed TSR will not fail during execution:
      replacing the TSR with a first portion of code and a second portion of code, wherein the first portion of code is configured to access the shared region without lock and unlock function calls and without software transactional memory semantics;
      executing the first portion of code without disabling existing hardware transactional memory support; and
      said first portion calling said second portion to perform a failure handling routine in response to an indication a failure occurs within said first portion.

2. The method as recited in claim 1, wherein said TSR comprises lock and unlock transaction synchronization function calls, and wherein said first portion of code comprises a replacement command pair in place of the lock and unlock function calls.

3. The method as recited in claim 2, further comprising generating code for said first portion operable to:
   initially access said shared region without the lock and unlock function calls and without software transactional memory semantics during the accessing; and
   ensure no other transaction is accessing said shared region without disabling existing hardware transactional memory support.

4. The method as recited in claim 3, wherein said code to ensure is operable to determine a predetermined safe value is stored in a predetermined memory location, wherein the predetermined memory location is accessible by both user-specified transactions and transactions within hardware transactional memory support.

5. The method as recited in claim 2, further comprising generating code for said second portion of code operable to perform a failure handling routine which utilizes lock and unlock transaction synchronization function calls, in response to an indication a failure occurs within said first portion.

6. The method as recited in claim 5, wherein setting said indication further comprises identifying one or more of the following: the TSR comprises a predetermined instruction type, the TSR exceeds available space in a store buffer, and the TSR comprises more than a predetermined number of instructions.

7. The method as recited in claim 6, wherein setting said indication further comprises utilizing program profiling information.

8. The method as recited in claim 2, wherein said first portion of code comprises hardware transactional memory primitives.

9. A computer system comprising:
   a processor; and
   a memory configured to store first program instructions and second program instructions;
   wherein the processor is configured assign software threads to waiting hardware threads and to execute said first program instructions to:
      examine said second program instructions;
      identify a transaction synchronization region (TSR) within said second program instructions, wherein the TSR accesses a shared region of memory within a shared memory;
      perform no transformation of the TSR, in response to predicting a transformed TSR will fail during execution; and
      in response to predicting a transformed TSR will not fail during execution:
         replace the TSR with a first portion of code and a second portion of code, wherein the first portion of code is configured to access the shared region without lock and unlock function calls and without software transactional memory semantics; and
         execute the first portion of code without disabling existing hardware transactional memory support; and
         cause said first portion to call said second portion to perform a failure handling routine in response to an indication a failure occurs within said first portion.

10. The computer system as recited in claim 9, wherein said TSR comprises lock and unlock transaction synchronization function calls, and wherein the code generator is configured to generate said first portion of code to include a replacement command pair in place of the lock and unlock function calls.

11. The computer system as recited in claim 10, wherein the code generator is configured to generate code for said first portion operable to:
   initially access said shared region without the lock and unlock function calls and without software transactional memory semantics during the accessing; and
   ensure no other transaction is accessing said shared region without disabling existing hardware transactional memory support.

12. The computer system as recited in claim 11, wherein said code to ensure is operable to determine a predetermined safe value is stored in a predetermined memory location, wherein the predetermined memory location is accessible by both user-specified transactions and transactions within hardware transactional memory support.

13. The computer system as recited in claim 10, wherein the code generator is configured to generate code for said second portion operable to perform a failure handling routine which utilizes lock and unlock transaction synchronization function calls, in response to an indication a failure occurs within said first portion.

14. The computer system as recited in claim 13, wherein the optimizer, in order to set said indication, is operable to identify one or more of the following: the TSR comprises a predetermined instruction type, the TSR exceeds available space in a store buffer, and the TSR comprises more than a predetermined number of instructions.

15. The computer system as recited in claim 14, wherein the optimizer, in order to set said indication, utilizes program profiling information.

16. The computer system as recited in claim 10, said first portion of code comprises hardware transactional memory primitives.

17. A non-transitory computer readable storage medium storing program instructions operable to parallelize code combined with hardware transactional memory support, wherein the program instructions are executable to:
   examine one or more program instructions;
   identify a transaction synchronization region (TSR) within said program instructions, wherein the TSR accesses a shared region of memory within a shared memory;
   perform no transformation of the TSR, in response to predicting a transformed TSR will fail during execution; and
   in response to predicting a transformed TSR will not fail during execution:
      replace the TSR with a first portion of code and a second portion of code, wherein the first portion of code is configured to access the shared region without lock and unlock function calls and without software transactional memory semantics; and
      execute the first portion of code without disabling existing hardware transactional memory support; and
      cause said first portion to call said second portion to perform a failure handling routine in response to an indication a failure occurs within said first portion.

18. The storage medium as recited in claim 17, wherein said TSR comprises lock and unlock transaction synchronization function calls, and wherein said first portion of code comprises a replacement command pair in place of the lock and unlock function calls.

19. The storage medium as recited in claim 18, wherein the program instructions are further executable to generate code for said first portion operable to:
   initially access said shared region without the lock and unlock function calls and without software transactional memory semantics during the accessing; and
   ensure no other transaction is accessing said shared region without disabling existing hardware transactional memory support.

20. The storage medium as recited in claim 18, wherein the program instructions are further executable to generate code for said second portion of code operable to perform a failure handling routine which utilizes lock and unlock transaction synchronization function calls, in response to an indication a failure occurs within said first portion.

* * * * *